United States Patent [19]
Brown et al.

[11] Patent Number: 5,768,420
[45] Date of Patent: Jun. 16, 1998

[54] METHOD AND APPARATUS FOR HANDWRITING RECOGNITION USING INVARIANT FEATURES

[75] Inventors: Michael Kenneth Brown, North Plainfield; Jianying Hu, Westfield; William Turin, East Brunswick, all of N.J.

[73] Assignee: Lucent Technologies Inc., Murray Hill, N.J.

[21] Appl. No.: 525,441

[22] Filed: Sep. 7, 1995

Related U.S. Application Data

[63] Continuation-in-part of Ser. No. 290,623, Aug. 15, 1994, Pat. No. 5,559,897, which is a continuation-in-part of Ser. No. 184,811, Jan. 21, 1994, Pat. No. 5,699,456.

[51] Int. Cl.$^6$ .................................................. G06K 9/00
[52] U.S. Cl. ................................ 382/203; 382/159
[58] Field of Search ................................ 382/181, 185, 382/186, 187, 188, 189, 190, 192, 195, 194, 197, 198, 199, 200, 201, 202, 203, 204, 205, 209, 224, 229, 241, 242, 243, 286, 289, 290, 291, 292, 293, 294, 123, 216, 193, 283, 119, 155, 159, 161, 168, 179, 217; 178/30; 364/920.4, 926.8, 927.1, 927.2, 972.6, 927.64, 943, 947, 943.43

[56] References Cited

U.S. PATENT DOCUMENTS

| | | | |
|---|---|---|---|
| 3,863,218 | 1/1975 | Oka et al. | 382/198 |
| 3,868,636 | 2/1975 | Schlang | 340/146.3 J |
| 4,365,235 | 12/1982 | Greanias et al. | 340/146.3 AC |

OTHER PUBLICATIONS

J. Hu, et al., Handwriting Recognition With Hidden Markov Models and Grammatical Constraints; Dec. 7–9, 1994. No Place of Publ. & No Page #.

R. Vaz, et al., Generation of Affine Variant Local Contour Feature Data; Pattern Recognition Letters 11 (1990) pp. 479–483.

B. Shahraray, et al., Optimal Smoothing of Digitized Contours; May 1986. No page #& No place of Publ. 5 Mar. 1997.

W.E.L. Grimson, An Implementation of a Computational Theory of Visual Surface Interpolation; Computer Vision, Graphics and Image Processing 22, pp. 39–69 (1983).

B. Shahraray, et al., Robust Depth Estimation From Optical Flow, Reprinted from Proceedings of the Second Int'l Conference on Computer Vision, Tampa, Florida, Dec. 5–8, 1988, no page #.

K. Arbter, et al., Application of Affine–Invariant Fourier Descriptors to Recognition of 3–D Objects; EEE Transactions on Pattern Analysis and Machine Intelligence, vol. 12/Jul. 1990, no page #.

T. Lyche et al., Computation of Smoothing and Interpolating Natural Splines Via Local Bases; Consumer Anal., No. 6, Dec. 1973, no page #.

C.C. Tappert, Cursive Script Recognitiion by Elastic Matching; IBM J. Res. Develop., vol. 6, Nov. 1982. No Page #.

A.M. Bruckstein, Invariant Signatures for Planar Shape Recognition under Partial Occlusion ;CVGIP: Image Understanding vol. 58, No. 1, Jul. pp. 49–65, 1993.

*Primary Examiner*—Leo Boudreau
*Assistant Examiner*—Bijan Tadayon

[57] ABSTRACT

Handwriting recognition which is invariant with respect to translation, rotation and scale is achieved with a new feature signal, ratio of tangents, and a new application of the normalized curvature feature. Use of these features is optimized by augmenting the ratio of tangents with the sign of local curvature and weighing each feature signal with its relative discriminative power.

26 Claims, 2 Drawing Sheets

METHOD AND APPARATUS FOR HANDWRITING RECOGNITION USING INVARIANT FEATURES

CROSS REFERENCE TO RELATED APPLICATION

This is a continuation in part of U.S. patent application Ser. No. 08/290,623, filed Aug. 15, 1994, U.S. Pat. No. 5,559,897, issued on Sep. 24, 1996 entitled "Methods and Systems for Performing Handwriting Recognition," which is itself a continuation in part of U.S. patent application Ser. No. 08/184,811, filed Jan. 21, 1994, now U.S. Pat. No. 5,699,456, entitled "Large Vocabulary Connected Speech Recognition System and Method of Language Representation Using Evolutional Grammar to Represent Context Free Grammars, the disclosures of which are incorporated herein by reference as if fully set forth herein. The present application as well as the two aforementioned applications are copending and commonly assigned.

FIELD OF THE INVENTION

The present invention relates generally to methods for handwriting recognition and the use of invariant features to reduce or eliminate geometric distortion.

BACKGROUND OF THE INVENTION

The principal difficulty in the recognition of patterns by computer is dealing with the variability of measurements, or features, extracted from the patterns, among different samples. The extracted features vary between samples for different reasons, depending on the type of pattern data being processed. In handwriting recognition the source of variations include input device noise, temporal and spatial quantization error, and variability in the rendering of input by the writer. There are two principal methods for dealing with variability in pattern recognition. One, the patterns can be normalized before feature extraction by some set of preprocessing transformations, and two, features can be chosen to be insensitive to the undesirable variability.

Writer induced variations have both a temporal and a spatial component. The temporal component relates to the sequence of strokes that comprise a letter; sequence of letters that comprise a word; and the sequence of elements of any defined grammar. The temporal component of writer induced variability is normalized during preprocessing and most probable sequences are approximated by Hidden Markov Model (HMM), processes well known in the art. The present invention addresses the spatial component of writer induced variation, that is, the geometric distortion of letters and words by rotation, scale and translation and teaches a new feature as well as a new use of an old feature for handwriting recognition, invariant with respect to translation, scale and rotation.

Eliminating feature spatial variation requires selecting a feature that is invariant under arbitrary similitude transformation, a transformation that involves a combination of translation, scale and rotation. The feature should allow recognition of a handwriting sample, independent of its position, size and orientation on a planar surface. Basic HMM based handwriting recognition systems known in the art, use the tangent slope angle feature as a signature of a handwriting sample, which is invariant under translation and scaling, but not rotation. Curvature is another feature that is invariant with respect to translation and rotation, but not scale. In general, it is easy to chose features that are invariant with respect to translation. It is more difficult to find features invariant with respect to scale and rotation and features invariant with respect to all three factors.

A similitude transformation of the Euclidean plane $R^2 \to R^2$ is defined by:

$$w = cUr + v$$

where c is a positive scalar, $$U = \begin{bmatrix} \cos\omega & -\sin\omega \\ \sin\omega & \cos\omega \end{bmatrix}, v = [v_x, v_y]^T$$

representing a transformation that includes scaling by c, rotation by angle $\omega$ and translation by v. Two curves are equivalent if they can be obtained from each other through a similitude transformation. Invariant features are features that have the same value at corresponding points on different equivalent curves.

A smooth planar curve $P(t) = (x(t), y(t))$ can be mapped into $$\tilde{P}(\tilde{t}) = (\tilde{x}(\tilde{t}), \tilde{y}(\tilde{t}))$$

by a reparametrization and a similitude transformation, resulting in $$\tilde{P}(\tilde{t}) = cUP(t(\tilde{t})) + v$$

Without loss of generality, one may assume that both curves are parametrized by arc length, so that $$d\tilde{s} = c \, ds$$

and the relationship between the corresponding points on the two curves is represented by $$P(s) = cUP\left[\frac{s - s_o}{c}\right] + v$$

It has been shown that curvature, $\kappa$ at the corresponding points of the two curves is scaled by $1/c$, so that $$\kappa(s) = \frac{1}{c} \kappa\left[\frac{s - s_o}{c}\right]$$

A feature invariant under similitude transformation, referred to as the normalized curvature, is defined by the following formula:

$$\frac{\kappa'(s)}{[\kappa(s)]^2} = \frac{\kappa'[(s - s_o)/c]}{\kappa[(s - s_o)/c]^2}$$

where the prime notation indicates a derivative. For a more complete explanation and derivation of this equation see A. M. Bruckstein, R. J. Holt, A. N. Netravali and T. J. Richardson, *Invariant Signatures for Planar Shape Recognition Under Partial Occlusion*, 58 CVGIP: Image Understanding 49–65 (July 1993), the teachings of which are incorporated herein by reference, as if fully set forth herein.

The computation of the normalized curvature defined above involves derivative estimation of up to the third order. Invariant features have been discussed extensively in computer vision literature. However, they have been rarely used in real applications due to the difficulty involved in estimating high order derivatives. As shown below, high order invariant features can be made useful with careful filtering in derivative estimation.

An invariant feature can be viewed as an invariant signature: every two equivalent curves have the same signatures. Any curve can be recognized and distinguished from classes of equivalent curves, by comparing its signature with the signature of one of the members of each class, which can be considered a model curve of that class. When the sample curve corresponds to only one model curve, in other words the sample always appears the same, there is complete correspondence between the sample curve and its matching model curve. In this case, many global invariant features, features normalized by global measurements such as total arc length, can be used for matching. This is the case for example, in handwriting recognition when whole word models are used. However, for systems aiming at writer-independent recognition with large and flexible vocabularies, letter models or sub-character models are often used. In this case each sample curve such as a word, corresponds to several model curves, such as letters, connected at unknown boundary points, which makes it more difficult to compute global invariant features. Therefore, it is important to develop invariant features which do not depend on global measurements. These features are sometimes referred to as local or semi-local invariant features to distinguish them from global features.

Two factors make it impossible to have exact match of model and sample signatures in real applications. First, since handwriting samples are not continuous curves, but comprise sequences of signals, i.e., sample points, the exact matching point on the model curve for each sample point cannot be determined. Second, even with similitude transformation, handwritten samples of the same symbol are not exact transformed copies of an ideal image. Shape variations which cannot be accounted for by similitude transformation occur between samples written by different writers, or samples written by the same writer at different times. Therefore only approximate correspondence can be found between the sample curve and the model curves. One method for determining such correspondence is to define a similarity measurement for the features and then apply dynamic time warping. For a more detailed description of dynamic time warping and its application for approximating correspondence between sample and model curves see C. C. Tappert, *Cursive Script Recognition by Elastic Matching*, 26 IBM Journal of Research and Development 765–71 (November 1982), the teachings of which are incorporated herein by reference, as if fully set forth herein. Another method is to characterize segments of curves by a feature probability distribution and find the correspondence between segments of curves statistically. The latter is the approach taken by HMM based systems, of which an improved system is disclosed and claimed in U.S. patent application Ser. No. 08/290,623 and its related applications.

SUMMARY OF THE INVENTION

Accordingly, it is an objective of the present invention to provide a method for curve recognition by providing a new feature signal of a curve which represents the curve independent of size, position, or orientation and which does not entail the calculation of high order derivatives. This new feature involves selecting two points on a curve, obtaining the point of intersection of the tangents of these two points, calculating the distances from each point to the point of intersection and taking the ratio of these distances. A special constant value is assigned for all points along a curve for which the ratio of tangents is undefined. This new feature is referred to as the ratio of tangents.

It is a further objective of the present invention to provide a method for handwriting recognition invariant to scale and rotation by representing a handwriting sample with feature signals, independent of scale and rotation. In furtherance of this objective, the ratio of tangents and normalized curvature feature signals are utilized either independently or together to represent the handwriting sample.

Handwriting recognition is optimized by representing a sample by the ratio of tangents augmented with the sign of local curvature, the normalized curvature and the tangent slope angle feature signals. The augmented ratio of tangents is referred to as the signed ratio of tangents. Each feature signal is also weighted according to its relative discriminative power with respect to the other feature signals.

It is a further objective of the present invention to provide an apparatus for handwriting recognition according to the above method. The apparatus may be based on a Hidden Markov Model system. A method for training a handwriting recognition system to recognize a handwriting sample in accordance with the above method is also taught.

DETAILED DESCRIPTION OF INVENTION

Systems for handwriting recognition are described in copending U.S. patent application Ser. No. 08/290,623, which is incorporated herein by reference, as if fully set forth herein. Knowledge of these systems and recognition of a handwriting sample from inputted features representative of the sample is presupposed.

Figure 1:
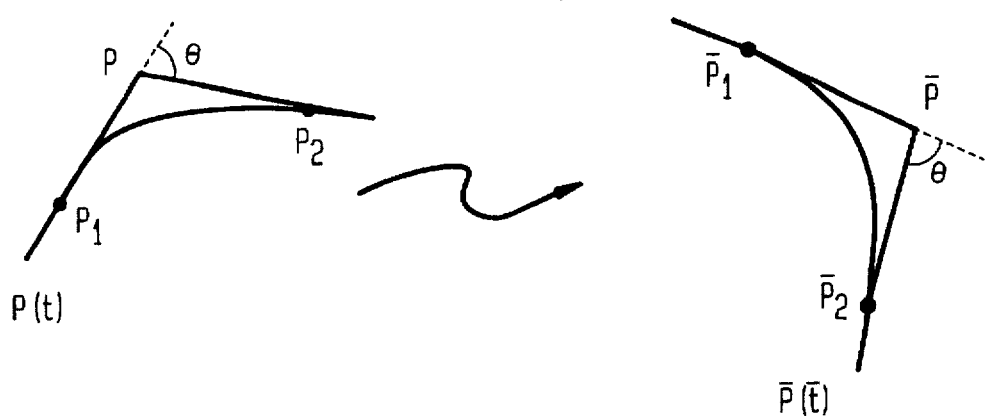
FIG. 1 depicts two curves with tangents drawn at two points on each curve, whose tangent slope angles differ by $\theta$.

Referring to FIG. 1, $P_1$ and $P_2$ are two points whose tangent slope angles differ by $\theta$. P is the intersection of the two tangents on $P(t)$. Similarly, $\tilde{P}_1$ and $\tilde{P}_2$ are two points on curve $\tilde{P}(\tilde{t})$ whose tangent slope angles also differ by $\theta$ and $\tilde{P}$ is the intersection of the two tangents on $\tilde{P}(\tilde{t})$. Since angles and hence turns of the curve are invariant under the similitude transformation, it can be shown that if point $\tilde{P}_1$ corresponds to point $P_1$, then points $\tilde{P}_2$ and $\tilde{P}$ correspond to points $P_2$ and P respectively. From the similitude transformation formula, it can be easily verified that:

$$|\tilde{P}_1\tilde{P}|=c|P_1P|; \quad |\tilde{P}\tilde{P}_2|=c|PP_2|$$

and therefore $$\frac{|PP_2|}{|P_1P|} = \frac{|\tilde{P}\tilde{P}_2|}{|\tilde{P}_1\tilde{P}|}$$

This last equation defines a new invariant feature, referred to as the ratio of tangents.

Figure 2:
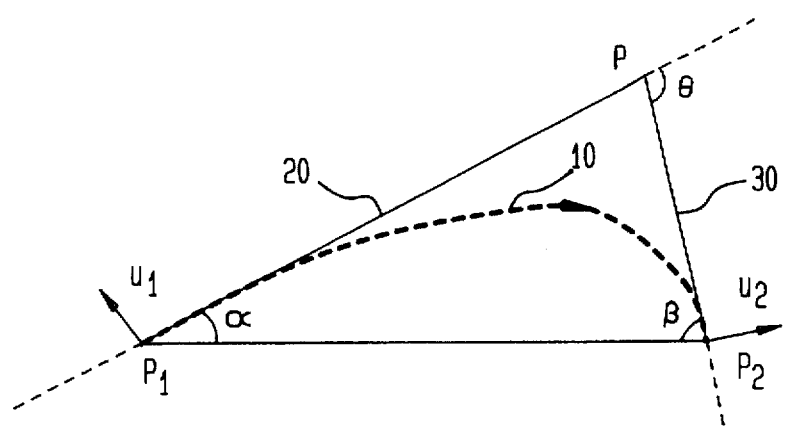
FIG. 2 depicts a curve with tangents drawn at two points and intersecting at point P, where the difference between the tangent slope angles is $\theta$.

Referring to FIG. 2 the ratio of tangents can be computed with an arbitrary tangent slope angle difference. Suppose $P_1$ and $P_2$ are two points along curve 10, whose tangent slope angles differ by $\theta$. P is the intersection of the two tangents 20 and 30. The ratio of tangents at $P_1$ is defined as $$Rt_\theta(P_1) = \frac{|PP_2|}{|P_1P|}$$

Suppose $u_1$ and $u_2$ are unit normal vectors at $P_1$ and $P_2$ respectively, using the law of sines the following formula for the ratio of tangents at P, can be derived:

$$Rt_\theta(P_1) = \frac{\sin(\alpha)}{\sin(\beta)} = \left| \frac{\tilde{P}_1 P_2 u_1}{\tilde{P}_1 P_2 u_2} \right|$$

For convenience, $P_2$ will be referred to as the $\theta$ boundary of $P_1$.

To use ratio of tangents as an invariant feature signal in handwriting recognition of a handwriting sample, referred to as a script, a fixed angle difference $\theta_0$ has to be used for all sample points in all scripts. Since real applications normally have only scattered sample points instead of a continuous curve, there are generally no two sample points whose slope angle difference is in fact equal to $\theta_0$. Instead, the ratio of tangents must be estimated. For sample point $P_i$'s $\theta_0$ boundary between points $P_j$ and $P_{j+1}$, several methods can be used to estimate the ratio of tangents $Rt_{\theta 0}(P_i)$. In one method one could explicitly estimate the location of $P_i$'s $\theta_0$ boundary by fitting a spline between $P_j$ and $P_{j+1}$ and then solving for the point along the spline segment that satisfies the tangent slope condition. A preferred method, however, is to use simple interpolation. Suppose $P_j$ is $P_i$'s $\theta_1$ boundary and $P_{j+1}$ is its $\theta_2$ boundary, such that $\theta_1 < \theta_0 < \theta_2$, an estimate of the ratio of tangents at $P_i$ is found using the following formula:

$$Rt_{\theta_o}(P_i) = Rt_{\theta_1}(P_i) + \frac{\theta_o - \theta_1}{\theta_2 - \theta_1}[Rt_{\theta_2}(P_i) - Rt_{\theta_2}(P_i)]$$

Obviously the choice of $\theta_0$ greatly affects the tangent ratio values. If $\theta_0$ is too small, the feature tends to be too sensitive to noise. On the other hand, if $\theta_0$ is too large, the feature becomes too global, missing important local shape characteristics. The preferred value for $\theta_0$ is approximately 10 degrees.

In one preferred embodiment of the present invention the ratio of tangents is augmented by the sign of curvature ("+" or "−"). The resulted feature has enhanced discriminative power and is referred to as signed ratio of tangents.

To evaluate accurately the invariant features described above, high quality derivative estimates up to the third order have to be obtained from the sample points. Simple finite difference based methods for derivative estimation do not provide the needed insensitivity to spatial quantization error or noise. Basic HMM based handwriting recognition systems already use a spline smoothing operator to provide data filtering in preprocessing. Similar operators can also be used for derivative estimation.

Smoothing spline approximation has very desirable properties for the estimation of smooth, continuous functions and derivatives from discrete, noisy samples, as evident from its applications to many problems. Smoothing spline approximation is more fully discussed in W. E. L. Grimson, *An Implementation of a Computational Theory of Visual Surface Interpolation*, 22 Comp. Vision, Graphics, Image Proc., 39–69 (1983); B. Shahraray, *Optimal Smoothing of Digitized Contours*, IEEE Comp. Vision and Pattern Rec. (CVPR) 210–218 (Jun. 22–26, 1986); B. Shahraray and M. K. Brown, *Robust Depth Estimation from Optical Flow*, Second Int. Conf. on Computer Vision (ICCV88) 641–650 (Dec. 5–8, 1988), the teachings of which are incorporated herein by reference, as if fully set forth herein.

Operators for estimating the derivative of any degree of the output of the spline approximation operation at the sample points can be constructed by evaluating the derivative of the spline approximation at the sample points. To obtain the derivative up to the third order, four operators, $A(\lambda)$, $A^1(\lambda)$, $A^2(\lambda)$ and $A^3(\lambda)$ are constructed. These operators are applied at each sample point to obtain estimates of the smoothed value of sample coordinates and their first, second and third order derivatives, which are then used to compute the ratio of tangents and normalized curvature.

The smoothness parameter $\lambda$, controls the tradeoff between the closeness of the approximating spline to the sampled data and the smoothness of the spline, or if the spline smoothing operator is viewed as a low pass filter, then $\lambda$ controls the cut-off frequency $f_c$. Since the handwriting signal—with the exception of cusps—consists predominantly of low frequencies and the predominant noise sources—mostly quantization error and jitter—are of high frequency content, it is easy to choose $\lambda$ so that the spline filter cuts off most of the noise without causing significant distortion of the signal. In one embodiment of the present invention, handwritten scripts are parameterized in terms of arc length by resampling at 0.2 mm intervals before feature extraction. At this sampling rate the dominant normalized spatial frequency components of most handwriting samples are below 0.08 Hz—0.4 mm$^{-1}$ or a spatial wavelength of 2.5 mm—. It is preferable to use the following values: $\lambda = 20$, corresponding to a cutoff frequency of approximately 0.425 mm$^{-1}$, m=3, reflecting a third order operator and n=15, representing the size of the spline.

Since signal frequency is much higher at cusps than along the rest of the script, cusps are usually smoothed out when these operators are applied. To retrieve the cusps, the tangent slope angle feature is used together with the ratio of tangents and normalized curvature features. Since cusps can be detected and preserved during the extraction of the tangent slope angle feature, information related to cusps can be captured by this feature.

The ratio of tangents and normalized curvature features may not always be evaluated reliably. For example, the ratio of tangents for the sample points along the trailing end of a stroke may not be defined since their $\theta_0$ boundaries may not exist. It is also not well defined around inflection points. Also, the normalized curvature tends to be highly unstable at points along a flat segment with near zero curvatures. To deal with these exceptions a special feature value "void", is assigned when a feature can not be evaluated reliably. In calculating state likelihood scores, a constant score is always produced when a feature value "void" is encountered. This is equivalent to assigning the probability of a feature being void to a constant for all states. This treatment is justified by the observation that when a feature is not defined or cannot be evaluated reliably at a particular sample point it does not provide any discriminative information.

In a discrete HMM system, each of the three features, tangent slope angle, ratio of tangents and normalized curvature, are quantitized into a fixed number of bins, represented simply by the index of the corresponding bin. Where the features are considered independently of one another, a separate distribution is estimated for each feature in each state during training. The joint probability of observing symbol vector $S_{k1,k2,k3} = [k_1, k_2, k_3]$ in state j is:

$$b_j(S_{k_1 k_2 k_3}) = \prod_{i=1}^{3} b_{ji}(k_i)$$

where $b_{ji}(k_i)$ is the probability of observing symbol $k_i$ in state j according to the probability distribution of the ith feature. It follows that the corresponding log-likelihood at state j is:

$$L_j(S_{k_1 k_2 k_3}) = \sum_{i=1}^{3} \ln[b_{ji}(k_i)]$$

In a conventional HMM implementation with Viterbi scoring, the log-likelihood is used directly in training and recognition. In this case, each of the three features contributes equally to the combined log-likelihood and therefore has equal influence over the accumulated scores and the optimal path.

Figures 3, 4:
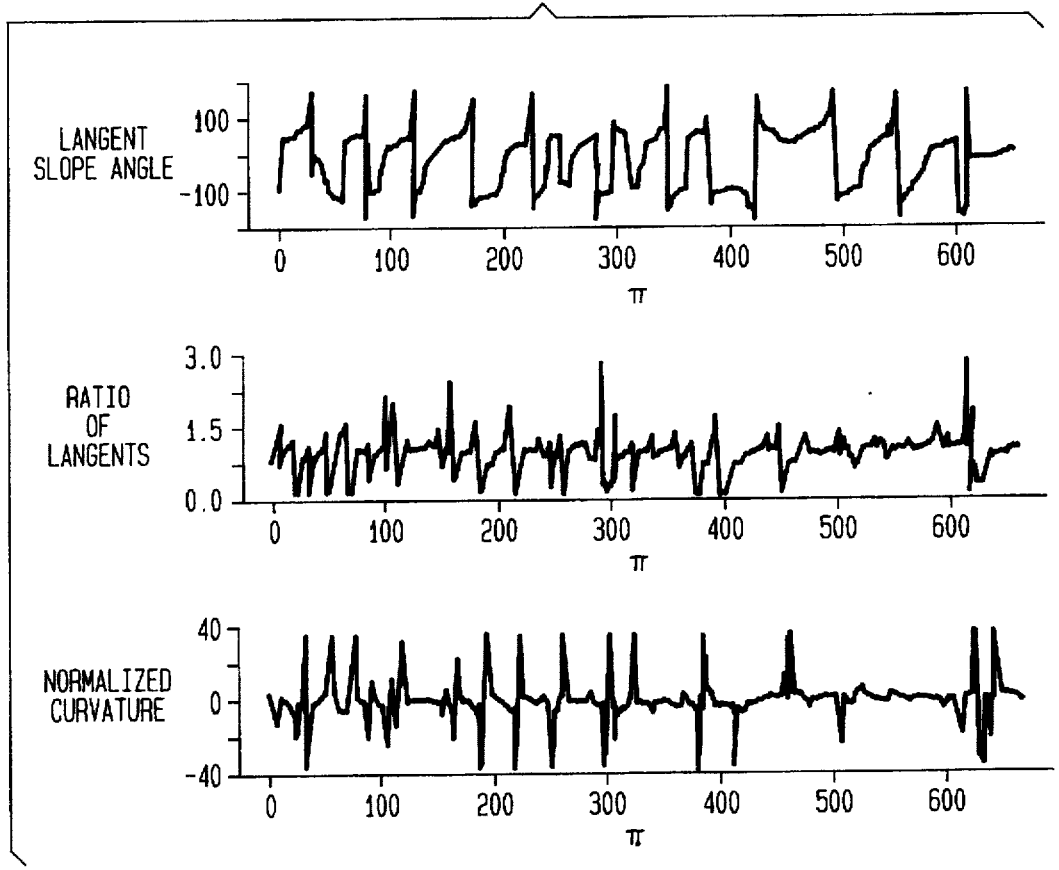
FIG. 3 depicts a handwriting sample after preprocessing.
FIG. 4 depicts plots of three features extracted from the sample shown in FIG. 3.

FIG. 3 shows a sample of "rectangle" (after preprocessing) and FIG. 4 plots the tangent slope angle, ratio of tangents and normalized curvature extracted from the sample of FIG. 3. Normalized curvature values are clipped at ±50. As the plots show, the values of normalized curvature and ratio of tangents are highly correlated, but there are some differences.

In one preferred embodiment of the present invention, the previous two equations are modified to adjust the influence of different features according to their discriminative power. In real life applications, the different features have different discriminative power, in other words they do not influence the probable model curve representing the sample curve equally. To account for this, the previous two formulas are modified to compute the weighted probability and weighted log likelihood, namely:

$$b_j(S_{k_1 k_2 k_3}) = \frac{\prod_{i=1}^{3} [b_{ji}(k_i)]^{w_i}}{N_j}$$

$$L_j(S_{k_1 k_2 k_3}) = \sum_{i=1}^{3} w_i \ln[b_{ji}(k_i)] - \ln(N_j)$$

where $N_j$ is the state normalization factor. Suppose that the number of bins for feature i is $n_i$, then $N_j$ is defined by:

$$N_j = \prod_{i=1}^{3} \sum_{k_i=1}^{n_i} [b_{ji}(k_i)]^{w_i}$$

therefore the weighted probabilities satisfy the condition:

$$\sum_{k_1 k_2 k_3} b_j(S_{k_1 k_2 k_3}) = 1; \ j$$

the weighted log-likelihood is not biased towards any particular state.

The weights $w_i$'s, specify the relative dominance of each feature. When used in training and recognition, the larger the weight—relative to other weights—the more the corresponding feature component contributes to the combined log-likelihood, and therefore the more influence it has on the path chosen by the Viterbi algorithm. In such an approach, the estimated true distribution of feature vectors in each state is replaced by a distorted probability distribution, derived from the distributions of each feature component.

In addition to weighing the individual features, more accurate modeling may be achieved by using vector quantization techniques or multidimensional continuous density functions to represent the intercorrelation of the three features discussed herein.

One example implementing the present invention involved use of the two invariant features, signed ratio of tangents and normalized curvature, together with the tangent slope angle feature. Each feature was quantitized to 20 bins. A separate probability distribution was estimated for each feature and the combined log-likelihood score was computed without the normalization factor. The assigned weights were 1.0 for tangent slope angle, 0.5 for signed ratio of tangents and 0.5 for normalized curvature.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for recognizing a curve independent of its size, position or orientation, by representing a sequence of points along said curve by a sequence of ratios of tangents, comprising the steps of:

selecting successive pairs of first and second points from said sequence of points along said curve such that each of said pairs of first and second points results in an identical predetermined tangent slope angle difference, and wherein the tangents of said first and second points intersect at a third point;

measuring the distance between each of said first and third points and the distance between each of said second and third points;

obtaining said sequence of ratios of tangents by calculating a ratio of tangents for each of said pairs of first and second points by determining the ratio of said distance between said second and third points to said distance between said successive first and third points, respectively; and recognizing said curve by comparing said sequence of ratios of tangents of said sequence of points to previously determined sequences of ratios of tangents of known sequences of points.

2. A method according to claim 1 further comprising the step of assigning a constant value to each of said calculated ratio of tangents where said calculated ratio of tangents is otherwise undefined.

3. A method for performing handwriting recognition of a handwriting sample, comprising the steps of:

generating feature signals representing said handwriting sample, wherein said feature signals are invariant with respect to scale and rotation and includes a ratio of tangents; and recognizing said handwriting sample based on said generated feature signals.

4. A method for performing handwriting recognition of a handwriting sample, comprising the steps of:

generating feature signals representing said handwriting sample, wherein said feature signals are invariant with respect to scale, rotation and translation and includes a ratio of tangents; and recognizing said handwriting sample based on said generated feature signals.

5. A method according to claim 3 wherein said generating step further comprises the steps of:

obtaining a signal sequence representative of said handwriting sample;

preprocesing said signal sequence to reduce signal abnormalities of said signal sequence to form high order derivatives of said signal sequence; and generating said invariant signal features based on said high order derivatives.

6. A method according to claim 4 wherein said generating step further comprises the steps of:

obtaining a signal sequence representative of said handwriting sample;

preprocesing said signal sequence to reduce signal abnormalities of said signal sequence to form high order derivatives of said signal sequence; and generating said invariant signal features based on said high order derivatives.

7. A method according to claim 5 wherein said preprocessing step includes the steps of:

utilizing a spline approximation technique for screening said signal abnormalities; and evaluating said high order derivatives of said spline approximation of said signal sequence.

8. A method according to claim 6 wherein said preprocessing step includes the steps of:

utilizing a spline approximation technique for screening said signal abnormalities; and evaluating said high order derivatives of said spline approximation of said signal sequence.

9. A method according to claim 7 wherein said step of utilizing a spline approximation technique includes utilizing a spline approximation operator for each derivative of said spline approximation.

10. A method according to claim 8 wherein said step of utilizing a spline approximation technique includes utilizing a spline approximation operator for each derivative of said spline approximation.

11. A method according to claim 9 further comprising the steps of:

utilizing a first spline approximation operator to obtain said signal sequence screened from said signal abnormalities;

utilizing a second spline approximation operator to obtain a first order derivative of said signal sequence screened from said signal abnormalities;

utilizing a third spline approximation operator to obtain a second order derivative of said signal sequence screened from said signal abnormalities; and utilizing a fourth spline approximation operator to obtain a third order derivative of said signal sequence screened from said signal abnormalities.

12. A method according to claim 10 further comprising the steps of:

utilizing a first spline approximation operator to obtain said signal sequence screened from said signal abnormalities;

utilizing a second spline approximation operator to obtain a first order derivative of said signal sequence screened from said signal abnormalities;

utilizing a third spline approximation operator to obtain a second order derivative of said signal sequence screened from said signal abnormalities; and utilizing a fourth spline approximation operator to obtain a third order derivative of said signal sequence screened from said signal abnormalities.

13. A method according to claim 3 wherein said invariant feature signals include a signed ratio of tangents feature signal of said handwriting sample.

14. A method according to claim 4 wherein said invariant feature signals include a signed ratio of tangents feature signal of said handwriting sample.

15. A method according to claim 3 wherein said invariant feature signals include a normalized curvature feature signal of said handwriting sample.

16. A method according to claim 4 wherein said invariant feature signals include a normalized curvature feature signal of said handwriting sample.

17. A method according to claim 3 further comprising the step of:

generating feature signals representing said handwriting sample, for which information related to cusps in said handwriting sample is preserved and detectable.

18. A method according to claim 4 further comprising the step of:

generating feature signals representing said handwriting sample, for which information related to cusps in said handwriting sample is preserved and detectable.

19. A method according to claim 3 wherein a ratio of tangents feature signal, a normalized curvature feature signal and a tangent slope angle feature signal are used collectively to represent said handwriting sample.

20. A method according to claim 4 wherein a ratio of tangents feature signal, a normalized curvature feature signal and a tangent slope angle feature signal are used collectively to represent said handwriting sample.

21. A method of training a handwriting recognition system, comprising the steps of:

representing a model handwriting sample with multiple feature signals, said multiple feature signals including a ratio of tangents feature signal, a normalized curvature feature signal and a tangent slope angle feature signal, each of said multiple feature signals having a discriminative power; and assigning weights to each of said multiple feature signals, relative to said discriminative power.

22. A method of training a handwriting recognition system, comprising the steps of:

representing a model handwriting sample with multiple feature signals, said multiple feature signals including a signed ratio of tangents feature signal, a normalized curvature feature signal and a tangent slope angle feature signal, each of said multiple feature signals having a discriminative power; and assigning weights to each of said multiple feature signals, relative to said discriminative power.

23. An apparatus for performing handwriting recognition of a handwriting sample comprising:

means for generating feature signals representing said handwriting sample, wherein said feature signals are invariant with respect to scale and rotation and includes a ratio of tangents; and means for recognizing said handwriting sample based on said generated feature signals.

24. An apparatus for performing handwriting recognition of a handwriting sample comprising:

means for generating feature signals representing said handwriting sample, wherein said feature signals are invariant with respect to scale, rotation and translation and includes a ratio of tangents; and means for recognizing said handwriting sample based on said generated feature signals.

25. An apparatus according to claim 23 wherein said means for recognizing said handwriting sample employs a Hidden Markov Model based handwriting recognition system.

26. An apparatus according to claim 24 wherein said means for recognizing said handwriting sample employs a Hidden Markov Model based handwriting recognition system.

* * * * *